United States Patent [19]

Chang et al.

[11] Patent Number: 4,701,313
[45] Date of Patent: Oct. 20, 1987

[54] REPLACING BORON WITH SILICON IN ZEOLITE BETA USING SICL4

[75] Inventors: Clarence D. Chang, Princeton, N.J.; Paul B. Weisz, Yardley, Pa.

[73] Assignee: Mobil Oil Corporation, New York, N.Y.

[21] Appl. No.: 864,746

[22] Filed: May 13, 1986

Related U.S. Application Data

[63] Continuation of Ser. No. 683,768, Dec. 19, 1984, abandoned.

[51] Int. Cl.$^4$ ............................................. C01B 33/20
[52] U.S. Cl. .................................... 423/277; 423/326; 423/328; 423/329; 502/77; 502/85; 502/202
[58] Field of Search ............... 423/326, 328, 329, 277; 502/77, 85, 202

[56] References Cited

U.S. PATENT DOCUMENTS

| Re. 28,341 | 2/1975 | Wadlinger et al. | 502/86 |
|---|---|---|---|
| 2,882,243 | 4/1959 | Milton | 423/329 |
| 2,882,244 | 4/1959 | Milton | 423/328 |
| 3,130,007 | 4/1964 | Breck | 23/113 |
| 3,247,195 | 4/1966 | Kerr | 260/242 |
| 3,308,069 | 3/1967 | Wadlinger et al. | 502/62 |
| 3,314,752 | 4/1967 | Kerr | 23/113 |
| 3,328,119 | 6/1967 | Robson | 423/329 |
| 3,551,353 | 12/1970 | Chen et al. | 423/328 |
| 3,702,886 | 11/1972 | Argauer et al. | 423/328 |
| 3,709,979 | 1/1973 | Chu | 423/328 |
| 3,832,449 | 8/1974 | Rosinski et al. | 423/328 |
| 3,972,983 | 8/1976 | Ciric | 526/328 |
| 4,273,753 | 6/1981 | Chang | 423/328 |
| 4,297,335 | 10/1981 | Lok et al. | 423/328 |
| 4,419,220 | 12/1983 | LaPierre | 208/111 |
| 4,444,902 | 4/1984 | Chang et al. | 502/71 |
| 4,503,023 | 3/1985 | Breck | 502/86 |
| 4,533,533 | 8/1985 | Dewing et al. | 423/328 |
| 4,556,549 | 12/1985 | Valyocsik | 423/326 |
| 4,567,805 | 3/1986 | Chang et al. | 502/85 |
| 4,569,833 | 2/1986 | Gortsema et al. | 423/305 |
| 4,597,956 | 7/1986 | Hinchey et al. | 423/328 |
| 4,605,637 | 8/1986 | Chang et al. | 502/77 |

FOREIGN PATENT DOCUMENTS 0055046 6/1982 European Pat. Off. .

OTHER PUBLICATIONS

Beyer et al., A New Method for the Dealuminization of Faujasite-Typezeolites, Catalysis By Zeolites Elesivier Scientific Publishing Co Amsterdam, Netherland 1980, pp. 203–210.
Fejes et al., A Novel Method for the Dealuminization of Zeolites, React. Kinet. Catal. Lett., vol. 14, #4, pp. 481–488, 1980.
Selected Papers, Publicly Available from Mobil Oil Corporation's Opposition to European Patent No. 55046B: 1. Affidavit of Ellen Lem Wu; 2. Opponent's Letter of 3 Sept. 1986, by John A. Cooper; 3. Proprietors Letter of 31 Jan. 1986, by D. L. Martin; 4. Opponent's Notice of Opposition 16 Jul. 1985, John A. Cooper.
M. Taromasso et al., Proceedings of the Fifth International Conference on Zeolites, "Molecular Sieve Borolicates" Naples, Italy, 2–6, Jun. 1980, pp. 40–48.
Civil Action 83-207, Mobil V. Amoco District Court Delaware.
Civil Action 85-102 Union Carbide V. Mobil District Court Delaware.

Primary Examiner—John Doll
Assistant Examiner—Jackson Leeds
Attorney, Agent, or Firm—Alexander J. McKillop; Michael G. Gilman; Dennis P. Santini

[57] ABSTRACT

The present invention relates to siliceous zeolite catalysts produced by a method which includes selecting an amount of aluminum framework species to be retained in a zeolite catalyst product, and use of a silicon substitution treatment to replace more reactive framework species used to control aluminum framework concentration. This technique substantially preserves the selected amount of the aluminum framework species. The zeolite product obtained has high reactivity and stability.

5 Claims, 1 Drawing Figure

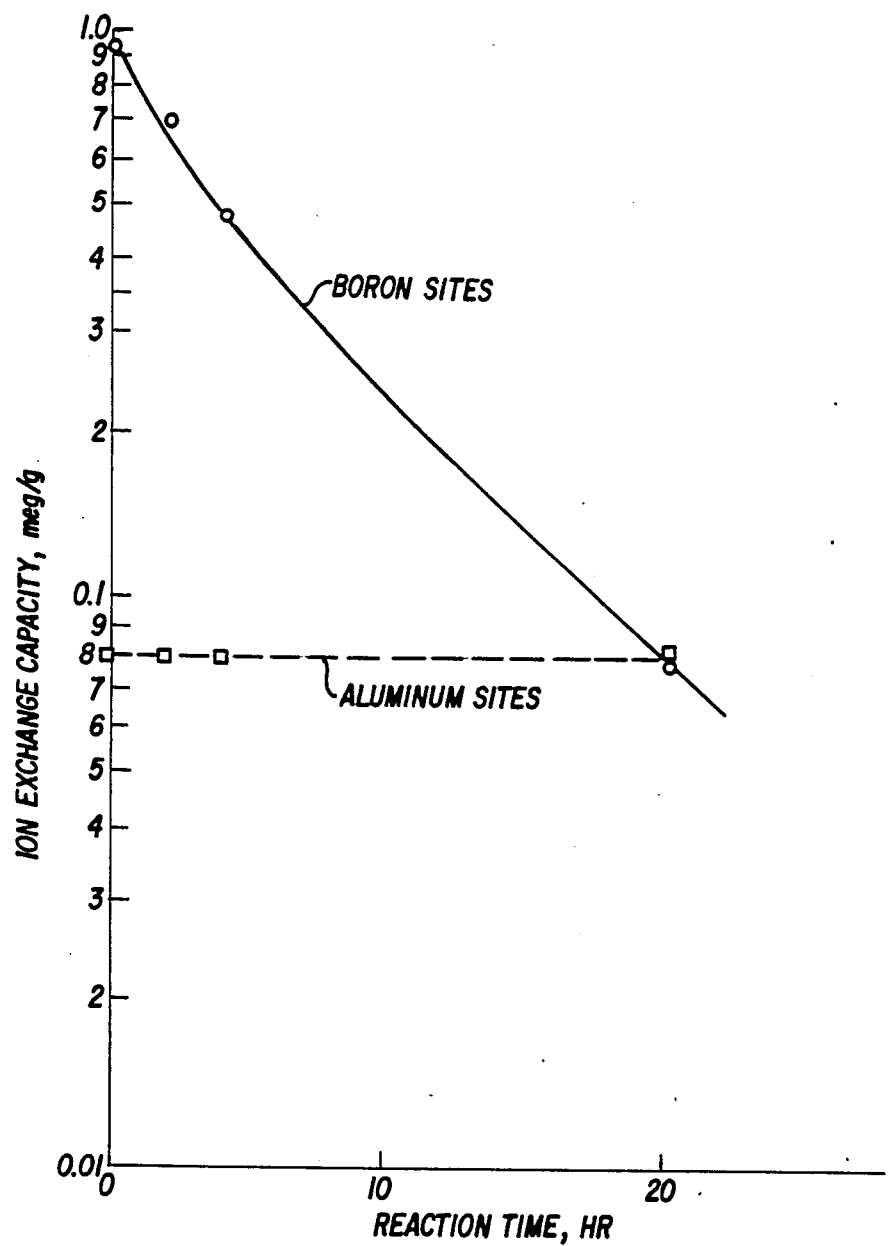
REACTION OF SiCl₄ WITH BORON BETA ZEOLITE

REPLACING BORON WITH SILICON IN ZEOLITE BETA USING SICL₄

This is a continuation of copending application Ser. No. 683,768, filed on Dec. 19, 1984, now abandoned.

1. FIELD OF THE INVENTION

The present invention relates to a method for producing siliceous zeolite catalysts having a selected aluminum content.

2. BACKGROUND ART

In zeolites, the locus of the catalytic activity is associated with framework aluminum. However, the amount needed for some catalytic applications is lower than that achieved by direct synthesis.

It is customary, in some cases, to produce a zeolite with a reduced framework aluminum content and to subject the zeolite after synthesis and calcination to a treatment with steam. That treatment progressively hydrolyzes some of the framework aluminum, rendering that portion non-catalytic, until only a desired amount of catalytic framework aluminum remains. This can require severe steaming conditions. In some cases, such steaming can damage other portions of the catalyst composition being prepared. For example, if the zeolite also has been provided with a metal component, damage can occur to that component. Also, progressive steam treatment must be terminated at just the correct time and temperature conditions, because further removal of aluminum will proceed.

Thus, it is desirable to have a procedure which more sharply defines the exact point at which removal will no longer proceed, that is, a procedure in which the remaining aluminum concentration will be sharply defined. It is the purpose of this invention to provide such a procedure.

In the past, the production of a low aluminum zeolite, for example, from Zeolite Beta, has been performed by synthesis to contain a desired amount of aluminum, but an excess amount of boron, for facilitating crystal growth. However, it is found that the boron remaining in the zeolite facilitates subsequent substitution by additional aluminum by migration from alumina binder. Binder is commonly used to formulate final catalyst mass into pellets, particles or extrudates. According to the present invention, excess boron would be substituted by silicon atoms, leading to stabilization of the crystal structure.

The use of a silicon halide, such as silicon tetrachloride, to perform a substitution of part of the aluminum existing in a zeolite has been taught generally by U.S. Pat. No. 4,273,753, hereby incorporated by reference. The present invention provides more specific methodology to perform a controlled and selected amount of substitution by silicon.

Thus, it is the purpose of this invention to overcome the disadvantages of the prior art and obtain zeolites having a high Si/Al ratio. It is a further objective of the present invention to produce a zeolite having high activity that has a stable dealuminated structure.

SUMMARY OF THE INVENTION

The present invention relates to a process for controlled production of siliceous zeolite having selected aluminum content comprising:

synthesizing a siliceous zeolite, with certain aluminum and boron content;

treating the zeolite with a silicon substitution treatment to replace boron with silicon; and recovering a siliceous zeolite having preserved the selected content of aluminum.

This invention also relates to a process for controlled production of siliceous zeolite having a selected aluminum content, comprising:

ion-exchanging an aluminosilicate zeolite to form a zeolite having at least two different cationic species associated with anionic framework of the zeolite;

treating the zeolite with a silicon substitution treatment; and recovering a siliceous zeolite having preserved the selected content of aluminum.

BRIEF DESCRIPTION OF THE FIGURE

The FIGURE shows the amounts of boron and aluminum in the boron-Beta zeolite of the invention.

DESCRIPTION

It has now been discovered that aluminosilicates can be prepared having a selected aluminum content, that is an aluminum content greater than 0 wt %. Aluminosilicates comprise both amorphous and crystalline materials. Examples of alumina silicates include zeolites, clays, gels, crystalline silica-aluminas and amorphous silica-aluminas.

Zeolites can be described as crystalline aluminosilicates consisting of a rigid three-dimensional framework of $SiO_4$ and $AlO_4$ in which the tetrahedra are cross-linked by the sharing of oxygen atoms, whereby the ratio of the total aluminum and silicon atoms to oxygen is 1:2. The electrovalence of the tetrahedra containing aluminum is balanced by the inclusion in the crystal of a cation, for example, an alkali metal or an alkaline earth metal cation. This can be expressed wherein the ratio of aluminum to the number of various cations, such as Ca/2, Sr/2, Na, K or Li is equal to unity. One type of cation may be exchanged either entirely or partially by another type of cation utilizing ion exchange techniques in a conventional manner. By means of such cation exchange, it has been possible to vary the properties of a given aluminosilicate zeolite by suitable selection of the cation. The spaces between the tetrahedra are occupied by molecules of water prior to dehydration.

Prior art techniques have resulted in the formation of a great variety of synthetic zeolites. These zeolites have come to be designated by letter or other convenient symbols, as illustrated by zeolite A (U.S. Pat. No. 2,882,243); zeolite X (U.S. Pat. No. 2,882,244); zeolite Y (U.S. Pat. No. 3,130,007); zeolite ZK-5 (U.S. Pat. No. 3,247,195); zeolite ZK-4 (U.S. Pat. No. 3,314,752); zeolite ZSM-5 (U.S. Pat. No. 3,702,886), hereby incorporated by reference; zeolite ZSM-11 (U.S. Pat. No. 3,709,979); zeolite ZSM-12 (U.S. Pat. No. 3,832,449); Zeolite Beta (U.S. Pat. No. 4,419,220), hereby incorporated by reference; and zeolite ZSM-20 (U.S. Pat. No. 3,972,983), merely to name a few.

Clay materials for use in the present invention include compositions composed primarily of clay minerals identified as hydrated aluminum silicates having the general formula $Al_2O_3 \cdot xSiO_2 \cdot yH_2O$, wherein x is an integer of from about 0.5 to about 600 and y, depending upon the state of hydration of the clay materials, is from about 1 to about 300, and wherein said hydrated aluminum silicate clay mineral may have associated therewith, for example, one or more metals or metal oxides selected from the group consisting of Group IA, IIA and VIII of the Periodic Table of Elements. Non-limiting examples of such hydrated aluminum silicate minerals which comprise the major proportion of clays for use in the present invention include:

kaolinite ($Al_2O_3 \cdot 2SiO_2 \cdot nH_2O$),
hallosite ($Al_2O_3 \cdot 3SiO_2 \cdot nH_2O$),
montmorillonite ((Mg, Ca)$O \cdot Al_2O_3 \cdot 5SiO_2 \cdot nH_2O$), and
illite ($K_2O$, $MgO$, $Al_2O_3$, $SiO_2$, $H_2O$),
all in variable amounts.

The quantity "n" of the above general formulas depends upon the degree of hydration of the particular clay mineral and will most often be between about 1 and about 300. Since the clay mineral for use herein must not be heated to a temperature exceeding 100° C. prior to or during ion exchange, "n" will seldom be below about 1.

Non-limiting examples of clays for use in the present invention include:

fuller's earth—a clay material having high natural adsorptive powers which is usually composed largely of the clay mineral attapulgite with some montmorillonite;

kaolin—a clay material being mainly constituted of the mineral kaolinite; and bentonite—a clay containing appreciable amounts of the clay mineral montmorillonite and usually having some magnesium and iron associated therewith.

According to the present invention, the method comprises a step of synthesis or ion-exchange and a step of silicon substitution for aluminum, boron or other framework constituents, other than silicon.

The invention has the added feature that either during synthesis or between completion of synthesis and commencement of the silicon substitution treatment, the aluminum atoms in the amount to be preserved are rendered less reactive to silicon substitution than the remaining aluminum or other existing framework atoms. Additionally, the conditions for the silicon substitution are chosen at such severity with respect to temperature and time that little of a less reactive species is reacted with the silicon reagent, while nearly all or all of the more reactant species is replaced by silicon.

Silicon substitution treatments are envisioned by this invention. Two silicon substitution treatments can be catalogued as follows:

(1) substitution of silicon for another element, other than aluminum; and (2) substitution of silicon for some aluminum.

They are the preferred treatments according to the teachings of the present invention.

According to one embodiment of this invention, zeolite crystallization is performed by the proper choice of aluminum and another species acceptable to the zeolite framework so that the product contains the desired ultimate amount of aluminum and excess of the other species to facilitate the desired synthesis. The concentration of the other specie is conventional and determinable by those skilled in the art. Preferably, the other species can be boron. Of course, other such species, having characteristics substantially the same as or equivalent to boron, can be used. The product is subsequently exposed to a flowing gas stream containing silicon halide at a temperature and for a time of exposure selected to extract substantially all of the other species. However, temperature and time are selected to substantially avoid extraction of aluminum from the lattice of the zeolite. Thus, selection of the final aluminum content is accomplished by controlling the aluminum/other species ratio during synthesis and choosing conditions for the silicon substitution which will selectively convert the other species.

The useful halogen component of the silicon halide utilized in the above process comprises chlorine, bromine and iodine. The order of preference for these halogens is in the order of the boiling point of the resultant other species halide formed with a halogen, with the corresponding lowest boiling point being preferred. Thus, the order of preference would be chlorine, bromine and iodine. The preferred silicon halide is silicon tetrachloride. Of course, other compounds that have substantially the same or equivalent properties to silicon halide can be used.

The temperature at which the removal of the other species will occur is determinable by a person skilled in this art.

Concerning the other species, the species is to be selected according to the teachings of this invention so that it permits extraction of substantially all, if not all, under certain temperature and time conditions, while substantially avoiding extraction of aluminum from the lattice of the zeolite. Such other species are known to those skilled in the art or can be selected by those skilled in the art without undue experimentation. As mentioned above, boron is the preferred other species.

The boroalumino silicate zeolite used in one embodiment of this invention is known to those skilled in the art. The zeolites can include a boroalumino silicate Zeolite Beta or any of the family of ZSM zeolites, such as those mentioned above.

According to another embodiment of the invention, it relates to a zeolite having an intrinsically high aluminum concentration as synthesized. The alumino silicate zeolite is converted into a form comprising at least two cationic constituents in selected ratio. The resulting zeolite is such that one of the cationic constituents, which is relatively easily converted by subsequent silicon treatment, exists in the concentration corresponding to the ultimately desired aluminum concentration to be attained on the zeolite. For example, the alumino silicate synthesized is subjected to a base exchange solution containing sodium and ammonium ion so that subsequent drying and calcining will produce a mixture of the protonic and the sodium forms. The silicon halide treatment is then chosen under conditions of severity, such that the protonated aluminum will readily react, that is, the following reaction:

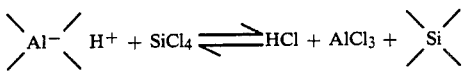

will take place, substituting a silicon atom at the site. The acid and aluminum chloride are volatilized. Again, silicon tetrachloride is the preferred silicon substitution agent. The preceding illustration is merely illustrative and not limiting.

This procedure may be used based on the pair of cations being ammonium and alkali metal ion, and other pairs that may prove to be sufficiently different in reactivity with the silicon substitution agent. In all cases, the silicon substitution treatment is chosen in conditions of temperature and time to provide adequate protection of the aluminum framework species that is not to be extracted. The conditions mentioned in the preceding treatment occurring during crystallization can be utilized here. The selection of the source of the sodium and ammonium ion is readily made by those skilled in the art. The drying and calcining procedures are conventional and known to those skilled in the art.

Thus, the present invention is characterized by a step of selecting an amount of aluminum to be retained in a product by use of a silicon substitution treatment which will substantially preserve the selected amount of aluminum framework species.

The process is applicable to known zeolites, preferably Zeolite Beta.

Without wishing to be bound by any particular theory of operability, it is believed that the non-halogen component of the silicon halide, that is, silicon, is deposited at the site previously occupied by the more reactive component to the silicon halide. Thus, it is considered that this method leads to even greater stabilization, because the vacancy left by this component is "filled" with another atom or molecule. However, the healing mechanism is not really known. Furthermore, this method can be used to introduce different atoms into the aluminosilicate structure, thus modifying catalytic function.

The improved characteristics of aluminosilicates treated in accordance with this invention, particularly those relating to increased $SiO_2/Al_2O_3$ mole ratios and hydrothermal stability renders them particularly attractive for application in a number of processes. Exemplary of such processes are the use of the resultant aluminosilicates as ion exchange media or as catalyst or catalyst supports in the conversion of organic compounds, particularly hydrocarbons. Exemplary of hydrocarbon conversion systems in which these compositions are particularly suitable are hydrocracking; cracking; hydrofining, for example, desulfurization and denitrogenation; isomerization; polymerization; alkylation; reforming; hydrogenation; dehydrogenation and the like. Typical catalytic applications of such compositions is in the conversion of hydrocarbons by hydrofining and hydrocracking, in which case the described aluminosilicates should contain a catalytically active amount of hydrogenation component, such as the Group VI or Group VIII metals, oxides and sulfides. By using members of Groups IB, IIB, IV, V, VI and VIII with said aluminosilicates, other reactions can be carried out, such as CO hydrogenation and oxidation; hydrocarbon oxidation, halogenation and nitration; and olefin hydration, merely to name a few.

It is also preferable when employing these aluminosilicates as catalysts or catalyst supports to render them in the form of relatively stable aggregates, for example, pellets, tablets, extrudates and the like. The use of an added binder composition is usually preferred to improve the structural properties of the resultant aggregate. The binder composition most commonly employed for aluminosilicates of this nature comprise predominantly alumina, certain forms of alumina being particularly preferred.

EXAMPLES

The following examples will serve to illustrate the invention without limiting it.

EXAMPLE 1

This experiment illustrates a silicon substitution treatment in which silicon is substituted for boron in a boron-Beta zeolite structure. The experiment is conducted according to the teachings disclosed above. The zeolite used is a conventional Zeolite Beta containing boron. This zeolite is reacted with $SiCl_4$ vapor at 315° C. for about 20 hours. The amounts of boron and aluminum in the boron-Beta zeolite are shown in the FIGURE. Change in ion-exchange capacity with time is shown in the FIGURE for both aluminum and boron framework sites. Ion-exchange capacity for the aluminum sites remains constant. However, ion-exchange capacity for the boron sites decreases significantly during reaction. These results show that boron is more susceptable to removal during silicon substitution than is aluminum. Such a difference in reactivity is used to substitute a more stable framework specie for a less stable species, while avoiding disturbance of aluminum species. This technique permits preserving a selected aluminum concentration in the zeolite.

EXAMPLE 2

This experiment illustrates another embodiment of the invention. It shows the ability to be selective about the amount of framework aluminum removed from a zeolite. This experiment is conducted using the hydrogen form of a conventional ZSM-5 zeolite (HZSM-5 zeolite) having a $SiO_2/Al_2O_3$ ratio of 70/1.

(a) For two hours, a HZSM-5 zeolite having a $SiO_2/Al_2O_3$ ratio of 70/1 is dried and purged with helium containing $SiCl_4$ at a pressure of 30 torr and at a temperature between 256° to 375° C. The product is ammonium-exchanged and ammonia measured using a conventional temperature programmed desorption (TPD) technique, which measures temperature programmed desorption of ammonia for the purpose of determining framework aluminum concentration.

(b) An aliquot of the same HZSM-5 zeolite is converted to the sodium form using a conventional $NaHCO_3$ treatment. The sodium form is then reacted with $SiCl_4$ in the manner described above. The results are reported in the following Table.

TABLE

| Catalyst Treatment HZSM-5 Zeolite | $SiO_2/Al_2O_3$ (Ratio by Weight) | $Al_2O_3$ Removed (By Weight) |
|---|---|---|
| Untreated | 70 | — |
| $SiCl_4$ and $NH_4$ Exchange | 642 | 88% |
| $SiCl_4$ and $NaHCO_3$ Exchange | 210 | 85% |

The data show that even at the mild conditions used, alumina is more easily removed from the acid form of the zeolite than from the sodium form. This shows that it is possible to be selective about amount of aluminum removal. This discovery permits preserving selected aluminum concentration in a zeolite during its use. The zeolite product obtained by the above treatment has greater stability than the untreated product.

Although the invention has been described in conjunction with specific embodiments, it is evident that many alternatives and variations will be apparent to those skilled in the art in light of the foregoing description. Accordingly, the invention is intended to embrace all of the alternatives and variations that fall within the spirit and scope of the appended claims.

What is claimed is:

1. A process for controlled production of siliceous zeolite having an aluminum content comprising:
providing a boron-containing Zeolite beta, with initial aluminum and boron contents each greater than the numeral 0;
treating the zeolite with silicon tetrachloride at a temperature and for a time sufficient to replace boron with silicon; and
recovering a siliceous zeolite having a reduced boron content but preserving said initial content of aluminum.

2. The process according to claim 1, further comprising drying the recovered zeolite.

3. The process according to claim 1, further comprising calcining the recovered zeolite.

4. The process of claim 1, wherein the temperature is about 315° C.

5. The process of claim 1, wherein the time is on the order of 20 hours.

* * * * *